United States Patent [19]
Bock et al.

[11] 3,923,806
[45] Dec. 2, 1975

[54] DISPERSE DYES BASED ON ISOINDOLENE DERIVATIVES

[75] Inventors: Gustav Bock, Neustadt; Wolfgang Elser, Frankenthal, both of Germany

[73] Assignee: BASF Aktiengesellschaft, Ludwigshafen (Rhine), Germany

[22] Filed: Mar. 7, 1974

[21] Appl. No.: 448,947

Related U.S. Application Data
[63] Continuation-in-part of Ser. No. 247,820, April 26, 1972, abandoned.

[30] Foreign Application Priority Data
May 3, 1971 Germany............................ 2121524

[52] U.S. Cl............ 260/256.4 C; 8/10; 260/302 F; 260/309.2; 260/310 R; 260/326.1; 260/257
[51] Int. Cl.².......................................... C07D 239/62
[58] Field of Search............................. 260/256.4 C

[56] References Cited
FOREIGN PATENTS OR APPLICATIONS
1,537,299  9/1967  France.......................... 260/256.4 C
703,669  8/1968  Belgium....................... 260/256.4 C

*Primary Examiner*—Donald G. Daus
*Assistant Examiner*—Mary C. Vaughn
*Attorney, Agent, or Firm*—Johnston, Keil, Thompson & Shurtleff

[57] ABSTRACT

Disperse dyes of the formula:

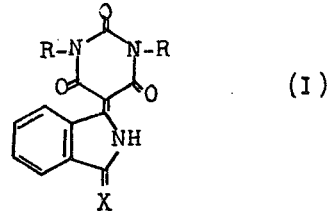

in which both R's are alkyl, phenyl or phenalkyl (the radical R bearing other substituents if desired) and X is the radical of a methyleneactive compound. The dyes dye fibers of linear polyesters brilliant greenish yellow to bluish red shades.

5 Claims, No Drawings

DISPERSE DYES BASED ON ISOINDOLENE DERIVATIVES

RELATED APPLICATION

This application is a continuation-in-part of our copending application Ser. No. 247,820, filed Apr. 26, 1972, now abandoned, the disclosure of which is incorporated herein by reference.

The invention relates to new disperse dyes based on 3-iminoisoindoline derivatives.

The invention relates to disperse dyes of the formula:

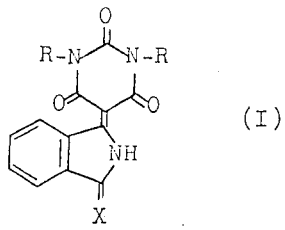

in which both R's are alkyl of one to five carbon atoms in which one or more hydrogen atoms may be replaced by chlorine, bromine, alkoxy of one to four carbon atoms, aryloxy, cyano, alkoxycarbonyl or acyloxy of a total of two to five carbon atoms, or phenyl which may bear chlorine, bromine, alkyl or alkoxy of one or two carbon atoms as substituent, or phenalkyl which may bear chlorine, bromine, alkyl or alkoxy of one or two carbon atoms as substituent in the phenyl radical, and in which the two R's may be indentical or different and X is the radical of a methyleneactive compound or of a primary heterocyclic amine.

The new dyes dye linear aromatic polyester fibrous material brilliant greenish yellow to bluish red shades by the carrier and HT methods. The dyeings obtained on polyesters have very good tinctorial properties such as good fastness to light.

Examples of alkyl and substituted alkyl for R are: methyl, ethyl, n-propyl, isopropyl, n-butyl, isobutyl, amyl, isoamyl, 2-methoxyethyl, 2-ethoxyethyl, 2-n-propoxyethyl, 2-isopropoxyethyl, 2-n-butoxyethyl, 2-isobutoxyethyl, 3-methoxypropyl, 3-ethoxypropyl, 3-n-propoxypropyl, 3-isopropoxypropyl, 2-chloroethyl, 2-bromoethyl, 2-cyanoethyl, 2-carbomethoxyethyl, 2-carboethoxyethyl, 2-carbopropoxyethyl and 2-carbobutoxyethyl.

Examples of substituted phenyl or aralkyl are: 2-chlorophenyl, 3-chlorophenyl, 4-chlorophenyl, 2-bromophenyl, 3-bromophenyl, 4-bromophenyl, 2-methylphenyl, 3-methylphenyl, 4-methylphenyl, 2-ethylphenyl, 3-ethylphenyl, 4-ethylphenyl, 2-n-butylphenyl, 3-n-butylphenyl, 4-n-butylphenyl, 2-tert.-butylphenyl, 3-tert.-butylphenyl, 4-tert.-butylphenyl, 2-methoxyphenyl, 3-methoxyphenyl, 4-methoxyphenyl, 4-ethoxyphenyl, benzyl and β-phenylethyl.

Methyl, 2-chloroethyl, 2-methoxyethyl, 3-methoxypropyl, 3-ethoxypropyl, 3-isopropoxypropyl and 2-cyanoethyl are particularly preferred as substituents of R.

Examples of radicals X are:

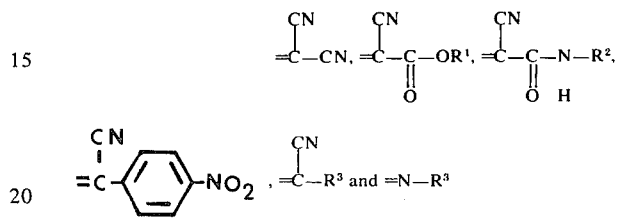

in which R¹ is alkyl of one to four carbon atoms such as methyl, ethyl, n-propyl, isopropyl, n-butyl or isobutyl, R² is hydrogen or alkyl of one to four carbon atoms such as methyl, ethyl, butyl, 3-methoxypropyl, 3-ethoxypropyl, or β-hydroxyethyl, phenalkyl such as β-phenylethyl, benzyl or aryl such as phenyl and R³ is a heterocycle such as 2-benzimidazolyl, 3-indazolyl or 2-benzothiazolyl. In the aforementioned compounds bearing the group R² those compounds wherein R² is methyl, ethyl, propyl, butyl, β-ethoxyethyl, γ-ethoxypropyl, β-methoxyethyl, γ-methoxypropyl, β-phenylethyl, phenyl, p-chlorophenyl or p-methylphenyl are preferred.

The following radicals are preferred for X:

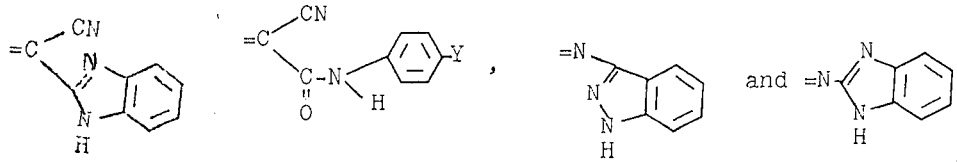

in which Y is hydrogen, chlorine or methyl.

Those dyes of the formula (I) in which R is methyl, 2-chloroethyl, 2-methoxyethyl, 3-methoxypropyl, 3-ethoxypropyl, 3-isopropoxypropyl or 2-cyanoethyl, X is one of the radicals:

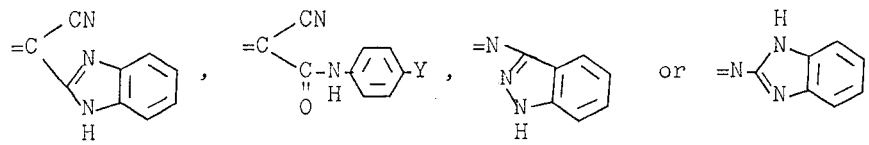

and Y is hydrogen, chlorine or methyl, the two R's being identical or different, are particularly preferred because of the outstanding tinctorial properties.

The new dyes are obtained, by a method known per se, by condensation of a monosubstitution product of 3-iminoisoindoline of the general formula

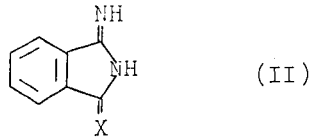

in which X has the above meanings with a derivative of barbituric acid of the general formula

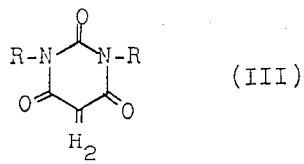

in which R has the above meanings in a solvent or diluent at elevated temperature.

The monosubstitution products of 3-iminoisoindoline of the general formula (II) are obtained by a conventional method by reaction of 3-imino-1-aminoisoindoline with a compound of the formula $XH_2$ in which X has the above meanings in a solvent or diluent. Examples of compounds $XH_2$ are malononitrile, alkyl cyanoacetates such as methyl, ethyl, n-propyl, n-butyl or isobutyl cyanoacetate, β-phenylethyl or 3-ethoxypropyl cyanoacetate, cyanoacetamide, N-substituted cyanoacetamides such as N-methylcyanoacetamide, N-ethylcyanoacetamide, N-butylcyanoacetamide, N-(3-methoxypropyl)-cyanoacetamide or N-(β-phenylethyl)-cyanoacetamide, 4-nitrobenzyl cyanide, cyanoacetanilide, 2-(cyanomethyl)-benzimidazole, 2-aminobenzimidazole, 3-aminoindazole or 2-aminobenzothiazole.

Barbituric acid derivatives of the general formula (III) include N-(2-chloroethyl)-N'-(3-methoxypropyl)-barbituric acid, N,N'-bis-(3-ethoxypropyl)-barbituric acid, N,N'-dimethylbarbituric acid, N-methyl-N'-(3-methoxypropyl)-barbituri acid, N,N'-bis-(3-methoxypropyl)-barbituric acid, N-methyl-N'-(3-ethoxypropyl)-barbituric acid, N-methyl-N'-(3-propoxypropyl)-barbituric acid, N-ethyl-N'-(3-ethoxypropyl)-barbituric acid, N-ethyl-N'-(3-methoxypropylbarbituric acid, N-benzyl-N'-(3-methoxypropyl)-barbituric acid, N-methyl-N'-(2-methoxyethyl)-barbituric acid, N-ethyl-N'-(2-methoxyethyl)-barbituric acid and bis-(2-methoxyethyl)-barbituric acid.

Suitable solvents and diluents include polar organic solvents, especially those which are miscible in all proportions with water such as dimethylformamide, diethylformamide, diethylacetamide, dimethylacetamide, N-methylpyrrolidone, glacial acetic acid, formic acid, glycol monomethyl ether, glycol monoethyl ether or mixtures of the same. Mixtures of dimethylformamide and glacial acetic acid are particularly suitable as solvents or diluents. Condensation is advantageously carried out at a temperature within the range from 50° to 130°C.

The monosubstitution product (II) is heated with the barbituric acid derivative (III) in the solvent or diluent to effect condensation. After the reaction is over the dye may be precipitated, depending on its solubility in the reaction medium, for example by pouring the reaction mixture into water followed by suction filtration or isolated by direct suction filtration of the reaction mixture.

Mixtures of dyes consisting of two or more dyes may be prepared (instead of individual dyes) (a) by reacting a mixture of monosubstitution products of 3-iminoisoindoline (II) with a barbituric acid derivative (III), or (b) by reacting a single monosubstitution product of 3-iminoisoindoline (II) with a mixture of barbituric acid derivatives (III), or (c) by reacting a mixture of monosubstitution products of 3-iminoisoindolines (II) with a mixture of barbituric acid derivatives (III).

The new dyes, particularly those in which both substituents R are alkyl, aryl and/or phenalkyl, and more particularly those in which both R's are alkyl are outstandingly suitable for dyeing linear aromatic polyester fibrous material from a dye liquor. Dyes in which both nitrogen atoms in the barbituric acid moiety bear hydrogen atoms, such as the dye described in Belgian Pat. No. 703,669 (obtained by reaction of 1-(cyanomethylenecarboxamido)-3-iminoindoline with barbituric acid) are not suitable for dyeing linear aromatic polyester material from a dye liquor because of their sparing solubility.

The following Examples illustrate the invention. The parts and percentages hereinafter given are by weight. The parts by volume specified bear the same relation to parts by weight as the liter to the kilogram.

EXAMPLE 1

14.5 parts of 1-((cyanobenzimidazolyl-2')-methylene)-3-iminoisoindoline (prepared from diiminoisoindoline and cyanomethylbenzimidazole in ethylene glycol) and 20 parts of N-(2-chloroethyl)-N'-(3-methoxypropyl)-barbituric acid are stirred in a mixture of 100 parts of dimethylformamide and 10 parts of glacial acetic acid for ninety minutes at 100°C. By precipitation with methanol, 15.5 parts of the dye of the formula:

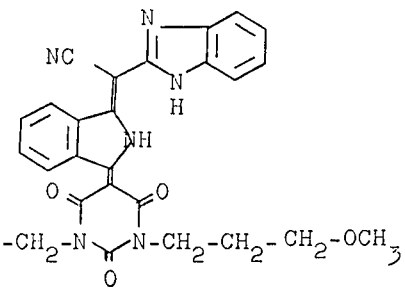

is obtained which dyes linear polyester fibrous material very brilliant scarlet shades of very good light and sublimation fastness.

EXAMPLE 2

85.5 parts of 1 (cyanobenzimidazolyl-2')-methylene)-3-iminoisoindoline is stirred with 140 parts of N,N'-bis-(3-ethoxypropyl)-barbituric acid in a mixture of 300 parts of dimethylformamide and 30 parts of glacial acetic acid for two hours at 100°C. 1500 parts by volume of ethanol is added. 138 parts of the dye of the formula:

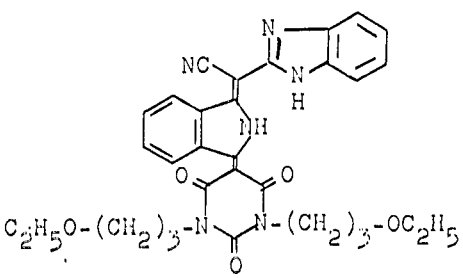

is isolated. It gives scarlet dyeings of excellent fastness properties on polyester fibers.

EXAMPLE 3

57 parts of 1-(cyanobenzimidazolyl-2')-methylene)-3-iminoisoindoline and 65 parts of a mixture of N,N'-dimethylbarbituric acid, N-methyl-N'-(3-methoxypropyl)-barbituric acid and N,N'-bis-(3-methoxypropyl)-barbituric acid in the ratio 1:2:1 are stirred for one hour at 100°C in 150 parts of dimethylformamide and 15 parts of glacial acetic acid. 94 parts of a dye mixture is precipitated by adding 700 parts of methanol. The mixture contains the dyes a, b and c in the ratio 1:2:1.

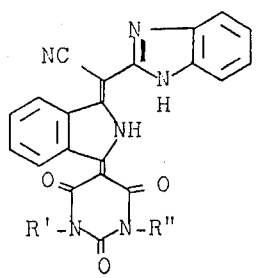

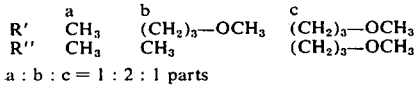

|    | a    | b            | c            |
|----|------|--------------|--------------|
| R' | CH₃  | (CH₂)₃—OCH₃  | (CH₂)₃—OCH₃  |
| R''| CH₃  | CH₃          | (CH₂)₃—OCH₃  | a : b : c = 1 : 2 : 1 parts

It gives scarlet red dyeings of excellent light and sublimation fastness on polyester fibers.

When 1-(cyanobenzimidazolyl-2)-methylene-3-iminoisoindoline is reacted with barbituric acid derivatives of the formula:

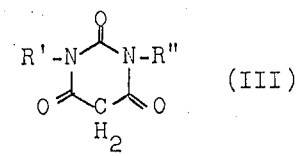

(III)

in which R' and R'' have the meanings given in the Table, in the molar ratio 1;1, dyes of the formula (Ia) are obtained which dye polyester fibers in the shades specified.

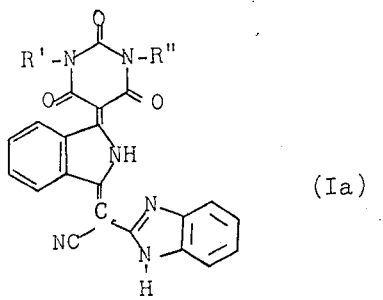

(Ia)

| Example | R' | R'' | Dyeing on polyesters |
|---|---|---|---|
| 4 | C₂H₅— | C₂H₅— | scarlet |
| 5 | n—C₄H₉— | n—C₄H₉— | scarlet |
| 6 | C₆H₅—CH₂— | C₆H₅—CH₂— | scarlet |
| 7 | CH₃— | n—C₄H₉— | scarlet |
| 8 | n—C₄H₉— | C₆H₅—CH₂—CH₂— | scarlet |
| 9 | CH₃— | C₂H₅O—CH₂—CH₂—CH₂ | scarlet |
| 10 | CH₃— | CH₃O—CH₂—CH₂—CH₂— | scarlet |
| 11 | CH₃— | (CH₃)₂CH—O—CH₂—CH₂—CH₂— | scarlet |
| 12 | CH₃— | CH₃O—CH₂—CH₂— | scarlet |
| 13 | C₂H₅— | CH₃O—CH₂—CH₂— | scarlet |
| 14 | C₂H₅— | CH₃O—CH₂—CH₂—CH₂— | scarlet |
| 15 | C₂H₅— | C₂H₅O—CH₂—CH₂—CH₂— | scarlet |
| 16 | n—C₄H₉— | C₂H₅O—CH₂—CH₂—CH₂— | scarlet |
| 17 | C₆H₅—CH₂— | C₂H₅O—CH₂—CH₂—CH₂— | scarlet |
| 18 | C₆H₅— | C₂H₅O—CH₂—CH₂—CH₂— | scarlet |
| 19 | Cl—CH₂—CH₂— | Cl—CH₂—CH₂— | scarlet |
| 20 | CH₃O—CH₂—CH₂— | CH₃O—CH₂—CH₂— | scarlet |
| 21 | C₂H₅O—CH₂—CH₂—CH₂— | C₂H₅O—CH₂—CH₂—CH₂— | scarlet |
| 22 | Cl—CH₂—CH₂— | CH₃O—CH₂—CH₂—CH₂— | scarlet |
| 23 | CH₃O—CH₂—CH₂— | (CH₃)₂CH—O—CH₂—CH₂—CH₂— | scarlet |
| 24 | C₂H₅— | NC—CH₂—CH₂— | scarlet |
| 25 | n—C₄H₉— | CH₃O—CH₂—CH₂— | scarlet |
| 26 | H— | CH₃—O—CH₂—CH₂—CH₂— | scarlet |

EXAMPLE 27

10.6 parts of 1-(cyanocarboxamidomethylene)-3-iminoisoindoline and 14.4 parts of N-butyl-N'-(2-phenylethyl)-barbituric acid are stirred for four hours at 100°C in 200 parts of dimethylformamide and 50 parts of formic acid. 17 parts of the yellow dye of the formula:

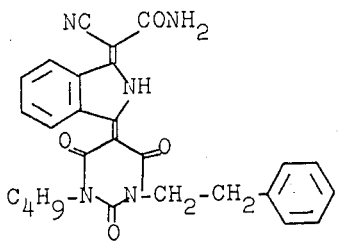

precipitates from the cooled reaction mixture. It dyes polyesters green yellow shades.

EXAMPLE 28

13.4 parts of 1-(cyano-(N-butylcarboxamido)-methylene)-3-iminoisoindoline and 16.2 parts of N-butyl-N'-(3-ethoxypropyl)-barbituric acid are stirred for one hour at 100°C in 100 parts of dimethylformamide and 10 parts of formic acid. Upon cooling, 16.7 parts of the dye of the formula:

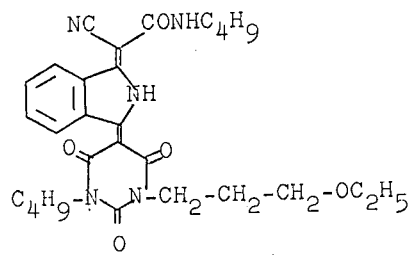

precipitates on cooling. The compound dyes polyesters brilliant green yellow shades.

EXAMPLES 29 to 55

3-iminoisoindoline derivatives of the formula (IIb);

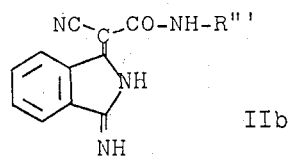

are reacted in the ratio 1:1 mole with barbituric acid derivatives of the formula (III):

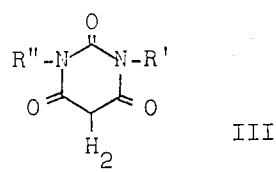

as described in Example 28; dyes of the formula (Ib)

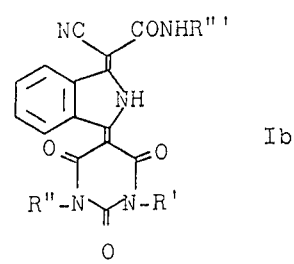

are obtained in which R', R'' and R''' have the meanings specified in the following Table:

| Example | R' | R'' | R''' | Shade on polyester |
|---|---|---|---|---|
| 29 | $CH_3-$ | $-(CH_2)_3-OC_2H_5$ | $C_2H_5-$ | green yellow |
| 30 | $CH_3-$ | $-(CH_2)_2-OC_2H_5$ | $C_2H_5-$ | green yellow |
| 31 | $CH_3-$ | $-(CH_2)_3-OC_2H_5$ | $-(CH_2)_3-OC_2H_5$ | yellow |
| 32 | $CH_3-$ | $-(CH_2)_3-OC_2H_5$ | $n-C_4H_9-$ | yellow |
| 33 | $CH_3-$ | $-(CH_2)_3-OC_2H_5$ | $-CH_2-CH_2-\text{C}_6H_5$ | green yellow |
| 34 | $CH_3-$ | $n-C_4H_9-$ | $C_2H_5-$ | yellow |
| 35 | $CH_3-$ | $n-C_4H_9-$ | $-CH_2-CH_2-OH$ | yellow |
| 36 | $CH_3-$ | $n-C_4H_9-$ | $n-C_4H_9-$ | yellow |
| 37 | $CH_3-$ | $n-C_4H_9-$ | $-CH_2-CH_2-\text{C}_6H_5$ | yellow |
| 38 | $CH_3-$ | $n-C_4H_9-$ | $-(CH_2)_3-OC_2H_5$ | yellow |
| 39 | $n-C_4H_9-$ | $-(CH_2)_3-OC_2H_5$ | $-(CH_2)_3-OC_2H_5$ | yellow |
| 40 | $n-C_4H_9-$ | $-(CH_2)_3-OC_2H_5$ | $C_4H_9-$ | green yellow |
| 41 | $n-C_4H_9-$ | $-(CH_2)_3-OC_2H_5$ | $C_2H_5-$ | yellow |
| 42 | $n-C_4H_9-$ | $-(CH_2)_3OC_2H_5$ | $-CH_2-CH_2-OH$ | yellow |
| 43 | $CH_3-$ | $-CH_3$ | $-(CH_2)_3-OC_2H_5$ | green yellow |
| 44 | $CH_3-$ | $-CH_3$ | $-(CH_2)_3-OC_2H_5$ | green yellow |
| 45 | $CH_3-$ | $-CH_3$ | $n-C_4H_9-$ | green yellow |

-continued

| Example | R' | R'' | R''' | Shade on polyester |
|---------|-----|------|-------|-------------------|
| 46 | n—C₄H₉— | n—C₄H₉— | n—C₄H₉— | green yellow |
| 47 | n—C₄H₉— | n—C₄H₉— | —(CH₂)₃—OC₂H₅ | green yellow |
| 48 | n—C₄H₉— | —CH₂—CH₂—C₆H₅ | —(CH₂)₃—OC₂H₅ | green yellow |
| 49 | n—C₄H₉— | —CH₂—CH₂—C₆H₅ | —C₂H₅ | yellow |
| 50 | C₆H₅—CH₂— | —(CH₂)₃—OC₂H₅ | —(CH₂)₃—OC₂H₅ | yellow |
| 51 | C₆H₅—CH₂— | —(CH₂)₃—OC₂H₅ | —C₂H₅ | yellow |
| 52 | C₆H₅— | —(CH₂)₃—OC₂H₅ | —C₂H₅ | yellow |
| 53 | C₆H₅— | —(CH₂)₃—OC₂H₅ | —C₄H₉ | yellow |
| 54 | CH₃— | —CH₂—CH₂—OCH₃ | —C₂H₅ | yellow |
| 55 | C₂H₅— | —CH₂—CH₂—OCH₃ | —C₂H₅ | yellow |

EXAMPLE 56

14.4 parts of 1-(cyanocarboxanilidomethylene)-3-iminoisoindoline and 11.4 parts of N-methyl-N'-(3-ethoxypropyl)-barbituric acid are stirred for three hours at 100°C in 100 parts of dimethylformamide and 15 parts of formic acid. 16.1 parts of the dye of the formula:

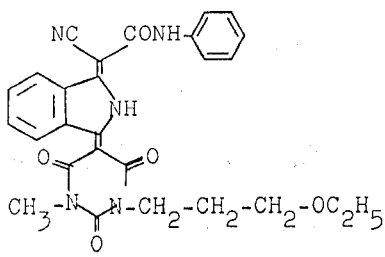

precipitates on cooling. It dyes polyester fiber reddish yellow shades of excellent fastness properties.

EXAMPLES 57 to 65 3-iminoisoindoline derivative of the formula (IIc)

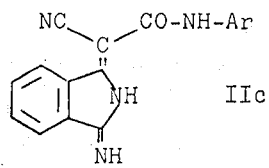

are reacted with barbituric acid derivatives of the formula (III) in the molar ratio 1:1 in the manner described in Example 56. Dyes of the formula (Ic)

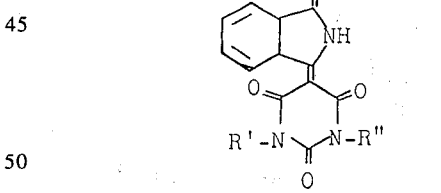

are obtained in which Ar, R' and R'' have the meanings given in the following Table.

| Example | R' | R'' | Ar | Dyeing on polyester |
|---------|-----|------|-----|--------------------|
| 57 | H— | —CH₃ | C₆H₅— | yellow |
| 58 | | —(CH₂)₃—OC₂H₅ (with C₆H₅—) | C₆H₅— | yellow |

| Example | R' | R'' | Ar | Dyeing on polyester |
|---|---|---|---|---|
| 59 | PhCH$_2$— | —(CH$_2$)$_3$—OC$_2$H$_5$ | Ph— | yellow |
| 60 | C$_2$H$_5$— | —CH$_2$—CH$_2$—CN | Ph— | yellow |
| 61 | C$_4$H$_9$— | —CH$_2$—CH$_2$—Ph | Ph— | yellow |
| 62 | CH$_3$— | —C$_4$H$_9$ | Ph— | yellow |
| 63 | CH$_3$— | —(CH$_2$)$_3$—OC$_2$H$_5$ | Cl—Ph— | yellow |
| 64 | CH$_3$— | —(CH$_2$)$_3$—OC$_2$H$_5$ | CH$_3$—Ph— | yellow |
| 65 | CH$_3$— | —CH$_2$—CH$_2$—OCH$_3$ | Ph— | yellow |

EXAMPLE 66

11.4 parts of 1-(cyanocarbomethoxymethylene)-3-iminoisoindoline and 10 parts of N-methyl-N'-butyl-barbituric acid are stirred for two hours at 100°C in 100 parts of dimethylformamide and 10 parts of formic acid. Upon cooling, 11 parts of an orange product of the formula:

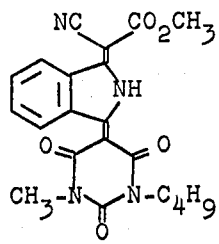

precipitates. The dye dyes aromatic polyester fibers brilliant yellow shades of good fastness properties.

EXAMPLES 67 to 71

3-iminoisoindoline derivatives of the formula (IId)

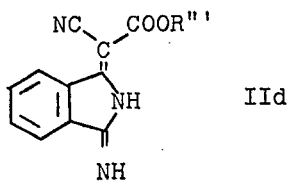  IId are reacted with barbituric acid derivatives of the formula (III) in a molar ratio of 1:1. Dyes of the formula (Id)

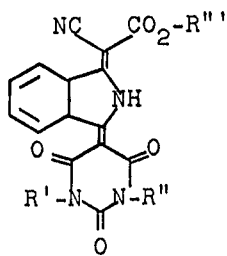

are obtained in which R', R'' and R''' have the meanings given in the following Table:

| Example | R' | R'' | R''' | Dyeing on polyester |
|---|---|---|---|---|
| 67 | CH$_3$— | —(CH$_2$)$_3$—OC$_2$H$_5$ | —CH$_3$ | yellow |
| 68 | Ph— | —(CH$_2$)$_3$—OC$_2$H$_5$ | —CH$_3$ | yellow |

-continued

| Example | R' | R'' | R''' | Dyeing on polyester |
|---------|----|----|-----|---------------------|
| 69 | ⌬-CH₂— | ⌬-CH₂— | —CH₃ | green yellow |
| 70 | CH₃— | —(CH₂)₃—OC₂H₅ | —CH₂—CH₂—⌬ | yellow |
| 71 | CH₃— | —(CH₂)₃—OC₂H₅ | —CH₂—CH₂—OH | yellow |

EXAMPLE 72

15 parts of 1-(cyano-(p-nitrophenyl)-methylene)-3-iminoisoindoline and 10.5 parts of N-phenyl-N'-(3-ethoxypropyl)-barbituric acid are stirred for 2 hours at 100°C in 100 parts of dimethylformamide and 10 parts of formic acid. After cooling, 15.3 parts of a yellow dye of the formula:

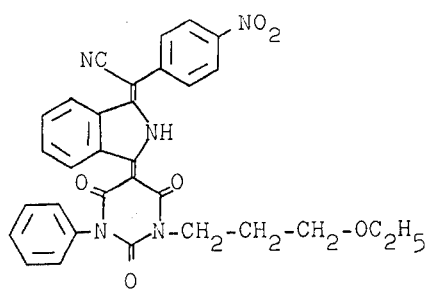

precipitates. The dye dyes aromatic polyester fibrous material green yellow shades of excellent fastness properties.

EXAMPLE 73

29.8 parts of 1-(cyano-(p-nitrophenylmethylene)-3-iminoisoindoline and 60 parts of a 1:2:1 mixture of N,N'-dimethylbarbituric acid, N-methyl-N'-(3-ethoxypropyl)-barbituric acid and N,N'-bis-(3-ethoxypropyl)-barbituric acid are stirred for ninety minutes at 100°C in 100 parts of dimethylformamide. After 1000 parts of methanol has been added, 30.5 parts of a yellow dye precipitates being a mixture of three days.

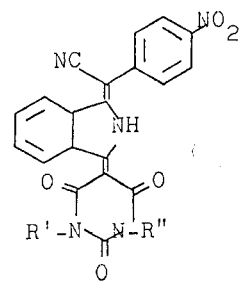

|  | a | b | c |
|---|---|---|---|
| R' | —CH₃ | —CH₃ | —(CH₂)₃OC₂H₅ |
| R'' | —CH₃ | —(CH₂)₃OC₂H₅ | —(CH₂)₃OC₂H₅ | a : b : c = 1 : 2 : 1 parts

The mixture dyes aromatic polyester fibrous material yellow shades of excellent fastness properties.

EXAMPLES 74 to 83

The N-phenyl-N'-(3-ethoxypropyl)-barbituric acid in Example 72 is replaced by an equivalent amount of barbituric acid derivative of the formula (III) and the procedure of Examples 72 is followed. Dyes of the formula (Ie)

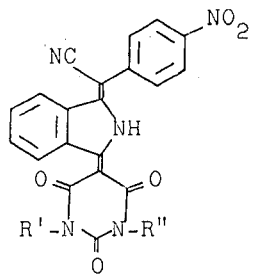 Ie are obtained in which R' and R'' have the meanings specified in the following Table.

| Example | R' | R'' | Dyeing on polyester |
|---------|----|----|---------------------|
| 74 | —CH₂—CH₂—Cl | —(CH₂)₃—OCH₃ | yellow |
| 75 | —CH₃ | —C₄H₉ | yellow |
| 76 | —C₄H₉ | —(CH₂)₃—OC₂H₅ | yellow |
| 77 | —CH₃ | —CH₃ | yellow |
| 78 | —CH₃ | —(CH₂)₃—OC₂H₅ | yellow |
| 79 | H— | —CH₃ | green yellow |
| 80 | ⌬-CH₂— | ⌬-CH₂— | yellow |

| Example | R' | -continued R'' | Dyeing on polyester |
|---|---|---|---|
| 81 | —C₄H₉ | —CH₂—CH₂— | yellow |
| 82 | —C₂H₅ | —CH₂—CH₂—CN | yellow |
| 83 | —C₄H₉ | —C₄H₉ | yellow |

EXAMPLE 84

13 parts of 1-(indazolyl-3'-imino)-3-iminoisoindoline and 11.4 parts of N-methyl-N'-(3-ethoxypropyl)-barbituric acid are stirred for two hours at 100°C in 100 parts of dimethylformamide and 10 parts of glacial acetic acid. When the cold reaction mixture is poured into water 16.5 parts of a brown dye of the formula:

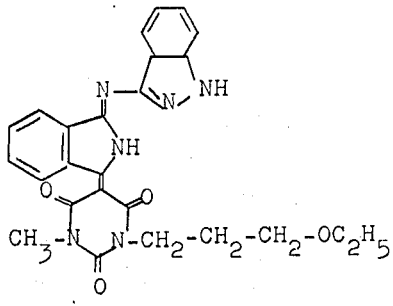

is precipitated. The dye dyes polyesters orange shades of good fastness properties.

EXAMPLES 85 to 91

3-iminoisoindoline derivatives of the formula (IIf)

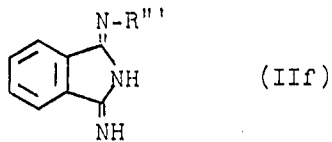     (IIf)

are reacted as described in Example 84 with barbituric acid derivatives of the formula (III) in a molar ratio of 1:1. Dyes of the formula (If)

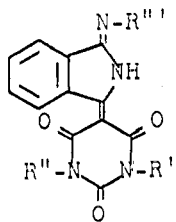     If are obtained in which R', R'' and R''' have the meanings given in the following Table:

| Example | R' | R'' | R''' | Dyeing on polyester |
|---|---|---|---|---|
| 85 | —CH₃ | n—C₄H₉— | 3-indazolyl | orange |
| 86 | —CH₃ | C₂H₅O—CH₂—CH₂—CH₂— | benzimidazolyl | red brown |
| 87 | —CH₃ | n—C₄H₉— | 2-benzthiazolyl | orange |
| 88 | —CH₃ | n—C₄H₉— | 2-benzimidazolyl | red brown |
| 89 | —CH₃ | CH₃O—CH₂—CH₂— | 2-benzimidazolyl | red brown |
| 90 | —C₂H₅ | CH₃O—CH₂—CH₂— | 2-benzimidazolyl | red brown |
| 91 | n—C₄H₉— | CH₃O—CH₂—CH₂— | 2-benzimidazolyl | red brown |

The invention is hereby claimed as follows:

1. A disperse dye of the formula

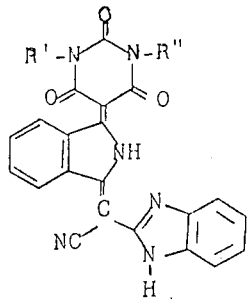

in which R' and R'' are alkyl or 1 to 5 carbon atoms, 2-chloroethyl, 2-cyanoethyl, 2-ethoxyethyl, 2-methoxyethyl, 3-methoxypropyl, 3-ethoxypropyl, 3-isopropoxypropyl, 2-phenylethyl, benzyl or phenyl, and wherein R' and R'' may be identical or different.

2. A disperse dye as claimed in claim 1 wherein R' and R'' respectively are methyl, 2-chloroethyl, 2-methoxyethyl, 3-methoxypropyl, 3-ethoxypropyl, 3-isopropoxypropyl or 2-cyanoethyl, and wherein R' and R'' may be identical or different.

3. The dye of the formula:

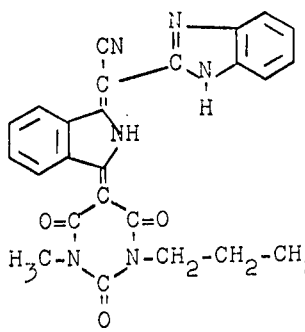

4. The disperse dye of the formula

17
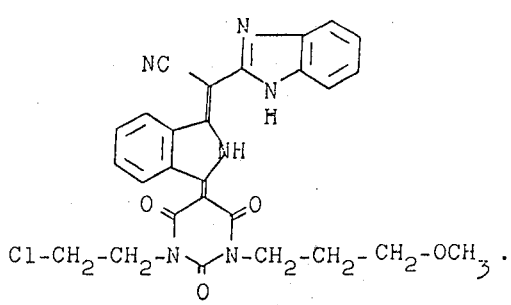
5. A mixture of disperse dyes a, b and c in the ratio of 1:2:1, respectively, each dye a, b and c having the formula
18
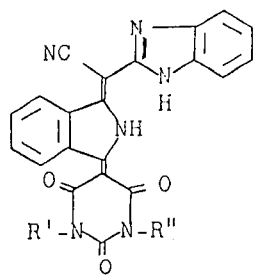
wherein, in dye a, both R' and R'' are —CH₃; in dye b, R' is —(CH₂)₃—OCH₃ and R'' is —CH₃, and in dye c, both R' and R'' are —(CH₂)₃—OCH₃.
* * * * *